United States Patent [19]

Yang

[11] Patent Number: 5,233,485
[45] Date of Patent: Aug. 3, 1993

[54] INDEX SEARCH METHOD AND SYSTEM THEREOF FOR DIGITAL VIDEO CASSETTE TAPE RECORDER

[75] Inventor: Chang-jin Yang, Taejeon, Rep. of Korea

[73] Assignee: Samsung Electronics Co., Ltd., Kyunggi, Rep. of Korea

[21] Appl. No.: 636,908

[22] Filed: Dec. 28, 1990

[51] Int. Cl.⁵ .................. G11B 15/18; H04N 5/78
[52] U.S. Cl. ............... 360/72.1; 360/14.2; 360/33.1; 358/183
[58] Field of Search ............. 360/33.1, 9.1, 18, 72.1, 360/14.1, 14.2, 72.2, 27; 358/335, 183, 162, 148, 313, 22

[56] References Cited

U.S. PATENT DOCUMENTS

| | | | |
|---|---|---|---|
| 4,802,019 | 1/1989 | Harada et al. | 360/33.1 |
| 4,918,518 | 4/1990 | Phillips | 358/148 |
| 5,027,230 | 6/1991 | Nakayama | 358/313 |
| 5,157,511 | 10/1992 | Rawai et al. | 358/183 |

FOREIGN PATENT DOCUMENTS

0058690  3/1988  Japan .................. 360/73.04

Primary Examiner—Andrew L. Sniezek
Assistant Examiner—Karsha Shaledia
Attorney, Agent, or Firm—Leydig, Voit & Mayer

[57] ABSTRACT

An index search method and apparatus is provided for a digital video cassette recorder or other video signal reproduction devices. Incoming video signals are directed to a video reduction device which produces reduced picture images. The reduced picture images are displayed within the incoming video signal on a display device during playback processing of the video tape. The user can display a different reduced picture images by activating an index search switch. A controller is provided to fast-forward or rewind the video tape to search for the reduced picture image identified by the user according to the above-described procedure.

9 Claims, 5 Drawing Sheets

| 1.1 | 1.2 | 1.3 | 1.4 | 1.5 | ... |
|---|---|---|---|---|---|
| 2.1 | 2.2 | 2.3 | 2.4 | 2.5 | |
| 3.1 | 3.2 | 3.3 | 3.4 | 3.5 | |
| 4.1 | 4.2 | 4.3 | 4.4 | 4.5 | |
| 5.1 | 5.2 | 5.3 | 5.4 | 5.5 | |
| ... | | | | | |

FIG.3B

| 1.1 | 1.5 | 1.9 | 1.13 | 1.17 | ... |
|---|---|---|---|---|---|
| 5.1 | 5.5 | 5.9 | 5.13 | 5.17 | |
| 9.1 | 9.5 | 9.9 | 9.13 | 9.17 | |
| 13.1 | 13.5 | 13.9 | 13.13 | 13.17 | |
| 17.1 | 17.5 | 17.9 | 17.13 | 17.17 | |
| ... | | | | | |

FIG.3C

| BUFFER MEMORY REGION 1 | BUFFER MEMORY REGION 2 | BUFFER MEMORY REGION 3 | BUFFER MEMORY REGION 4 |
|---|---|---|---|

| A, 1 | A, 2 | REGION 1 |
| B, 1 | B, 2 | REGION 2 |
| C, 1 | C, 2 | REGION 3 |
| D, 1 | D, 2 | REGION 4 |

FIG.5A

| 1.1 | 1.2 | 1.3 | 1.4 |
| 2.1 | 2.2 | 2.3 | 2.4 |
| 3.1 | 3.2 | 3.3 | 3.4 |
| 4.1 | 4.2 | 4.3 | 4.4 |

INDEX SEARCH METHOD AND SYSTEM THEREOF FOR DIGITAL VIDEO CASSETTE TAPE RECORDER

BACKGROUND OF THE INVENTION

The present invention relates to an index search method and system for a digital video cassette tape recorder, and more particularly to a method and system for performing an index search efficiently by storing a picture image in a memory during playback processing and displaying the stored picture image into a reduced still picture by a picture-in-picture from during playback processing.

Generally, a counter is used to search a predetermined picture image by presetting a plurality of the user's desired positions of the picture image with a video cassette tape recorder (hereinafter, referred to a VCR) utilized as a video signal recording and reproducing apparatus in an office and at home. Accordingly, the present position of the picture image can not be searched out accurately and speedily with the counted value of the position of the picture image in the counter.

SUMMARY OF THE INVENTION

It is an object of the present invention to provide an index search method for identifying the predetermined picture image with a reduced still picture in order to search a plurality of the user's desired positions of the picture images.

It is another object of the present invention to provide an index search apparatus for displaying a user's desired picture image as a reduced still picture image during searching of a predetermined picture image having index information, after the user's desired positions of the picture images are designated with each of the index information.

To accomplish the above-mentioned objects, there is provided an index search method for recording header and address information on a control track of a video tape when a video signal is recorded in a digital video cassette tape recorder and for searching a user's desired position of the picture image in accordance with the recorded header and address information when the video signal is reproduced, comprising:

- a first process for controlling a main controller within the digital video cassette tape recorder in accordance with the address data picked up from the control track of the video tape and the signal outputted from an index search switch whenever the index search switch is selected by the user;
- a second process for storing each of the data of the picture image reduced in a picture reduction means into an address region of a buffer memory determined in the first process;
- a third process for storing index picture image data selected by an index search switch from among the index picture image data stored in the second process into a frame memory when a memory address of the preset reduced picture image comes over during storing original picture image data in the frame memory;
- a fourth process for reading out the original picture image data and the reduced still picture image data from the frame memory and displaying the reduced still picture image in a part of the original picture image.

An apparatus for performing an index search method according to the present invention comprises a video signal record processing circuit for recording the video signal on a video tape after converting the video signal into a digital signal, a video signal playback processing circuit for reproducing the digital signal picked up from the video tape and converting the digital signal into an analog signal and outputting the analog signal, an address information record processing circuit for recording the address information on the control track of the video tape when the digital video signal is recorded on the video tape, and an address information playback processing circuit for reproducing the address information picked up from the control track of the video tape when the digital video signal is reproduced from the video tape, the video signal playback processing circuit comprising:

- a playback amplifier for amplifying the reproduced digital video signal from the video tape through a playback head;
- an equalizer for equalizing the video signal outputted from the playback amplifier;
- a digital signal detector for detecting a digital signal in the video signal supplied from the equalizer;
- a decoder for decoding the video signal supplied from the digital signal detector;
- a switch panel including an index switch for selecting the video signal to be indexed among the digital video signals from the decoder, a search switch for selecting and outputting the indexed picture image by the index switch, and a reset switch for clearing the indexed picture images;
- a main controller for controlling a memory control portion in accordance with a control signal which a user selects from the switch panel and an address data picked up from the control track of the video tape;
- a picture reduction means for reducing the video signal outputted from the decoder in accordance with a control signal supplied from the memory control portion;
- a buffer memory means for reading in and writing out the reduced picture image data in the picture reduction means in accordance with control signals supplied from the memory control portion;
- a multiplexer for multiplexing the original picture image data and the reduced picture image data supplied from the buffer memory in accordance with a selection signal outputted from the memory control portion;
- a frame memory for outputting the original picture image data including the reduced picture image data in accordance with control signals supplied from the memory control portion; and
- a D/A converter for converting the digital video signal outputted from the frame memory into an analog video signal and outputting the analog converted video signal.

DETAIL DESCRIPTION OF THE PREFERRED EMBODIMENT

A preferred embodiment of the present invention will be described below in detail.

Figure 1:
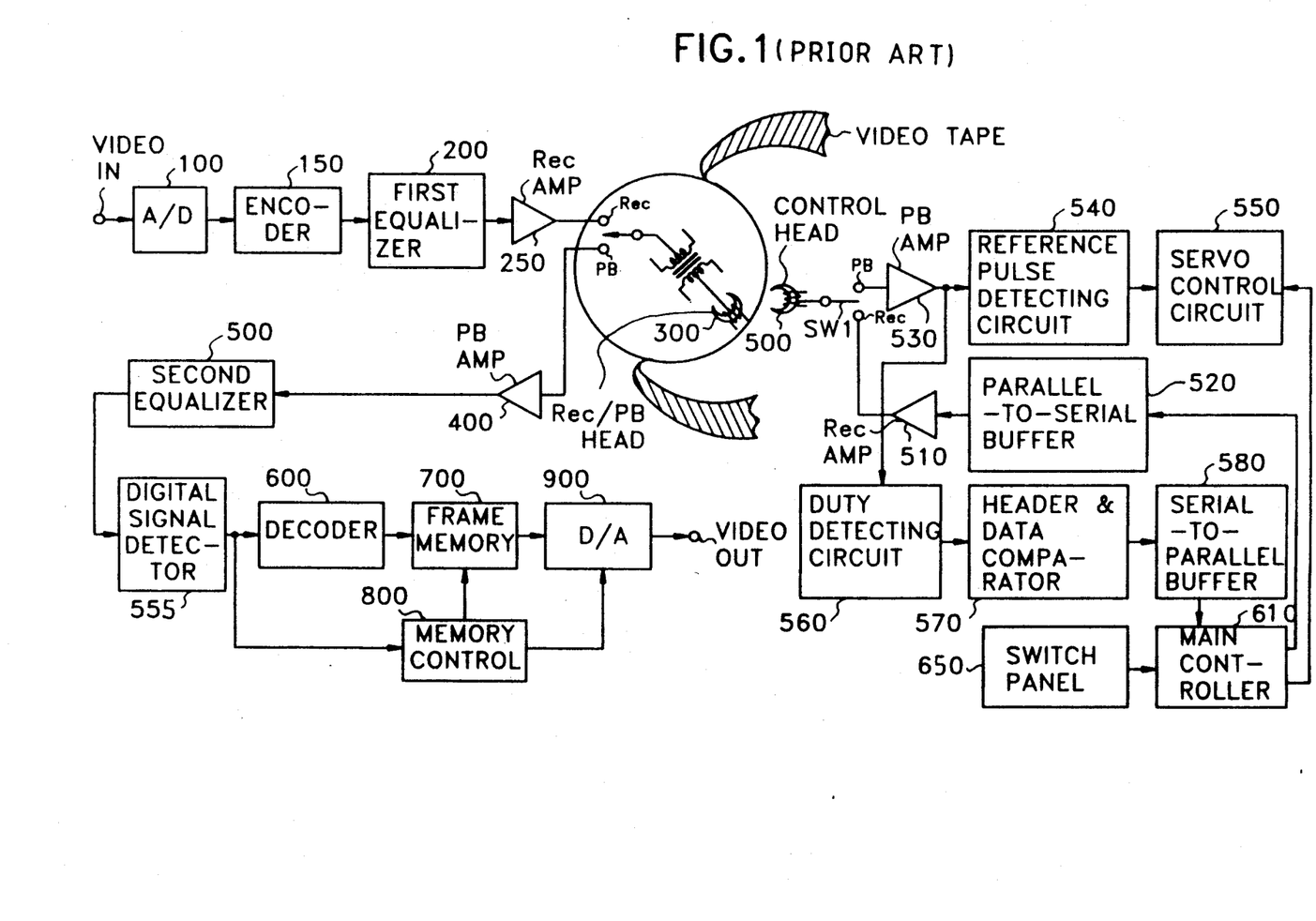
FIG. 1 is a block diagram schematically showing a digital video cassette tape recorder of the prior art.

FIG. 1 is a block diagram schematically showing a digital video cassette tape recorder of the prior art. Referring to FIG. 1, when a video signal is recorded on a video tape, the input video signal is converted into a digital signal in an A/D converter 100. The converted digital signal is recorded on the magnetic video tape through an encoder 150, a first equalizer 200 and a recording amplifier 250. When the recorded video signal is reproduced from the video tape, the video signal picked up through a playback amplifier 400 is supplied to a digital signal detector 555 through a second equalizer 500.

This digital signal detector 555 detects the digital signal and supplies it to a decoder 600. The digital video signal decoded in the decoder 600 is stored in a frame memory 700. The frame memory 700 is controlled by a memory control portion 800. The original picture image data read out from the frame memory 700 under the control of the memory control portion 800 is converted into an analog signal in a D/A converter 900, thereby outputting the analog converted video signal.

Now, record and playback processing circuits for recording header and address information on, and reproducing such information from, a control track of a video tape when a picture image is recorded on and reproduced from the video tape will be described below with reference to FIG. 1 and FIG. 4.

Figure 4A:
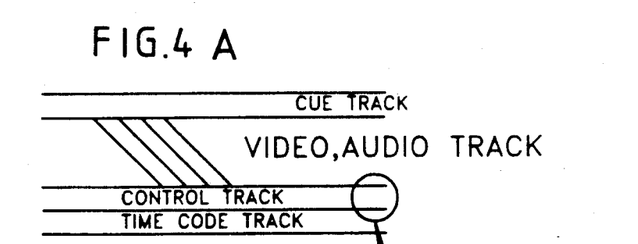
FIG. 4A shows each of the tracks of a video tape.
Figure 4B:
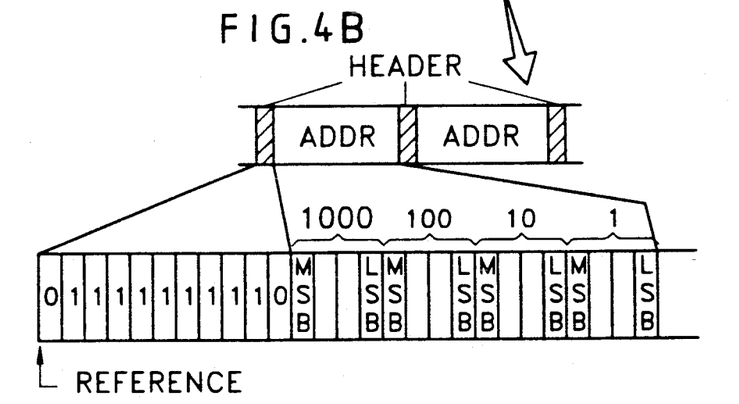
FIG. 4B shows an enlargement of a control track of the video tape shown in FIG. 4A.
Figure 4C:
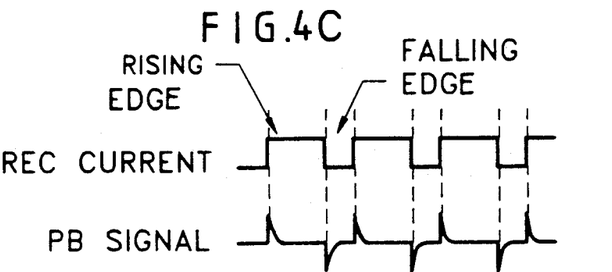
FIG. 4C shows waveforms of the recording current and the playback signal when the header and address is recorded in the control track of the video tape.
Figure 4D:
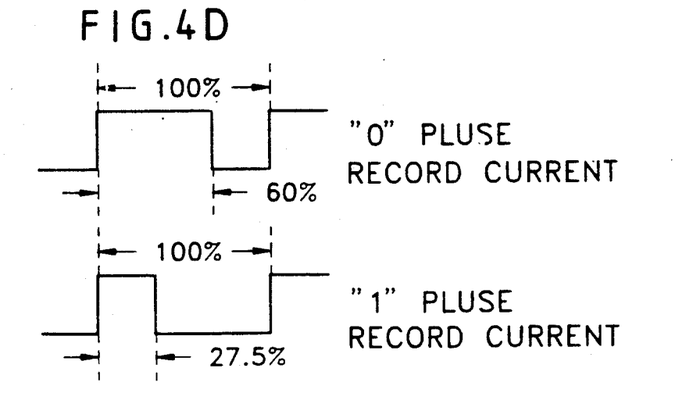
FIG. 4D shows duties in accordance with "0" and "1" of the waveform of the recording current.

Referring to FIG. 1, when a picture image is recorded on a video tape, a header and address signal as shown in FIG. 4B from a main controller 610 is supplied to a control head 500 through a parallel-to-serial buffer 520 and a record amplifier 510, and is recorded on the video tape. At this time, each bit of the header and address corresponds to each track of the video and the audio track, and as the video tape proceeds the address is increased. A waveform of the recording current when the header and address signal is recorded on the control track shown in FIG. 4A is represented as shown in FIG. 4C, and the values of "0" or "1" of each bit is classified as shown in FIG. 4D. That is, "0" data is represented in a pulse having duty 60% and "0" data is a pulse having duty 27.5%.

If the detected signal from a control head 500 is amplified in a playback amplifier 530 of FIG. 1 during the playback processing, the playback signal as shown in FIG. 4C is output. This playback signal is supplied to a reference pulse detecting circuit 540 and a duty detecting circuit 560. The reference pulse detecting circuit 540 supplies the playback signal as shown in FIG. 4C to a servo control circuit 550, and utilizes the rising edge of the playback signal, thereby controlling a servo motor in order to control an accurate travelling of the video tape. The duty detecting circuit 560 detects a rising edge and a falling edge, and accordingly when the duty is 60%, the "0" data is supplied to a header and address data comparator 570, while when the duty is 27.5%, the "1" data is supplied to the header and address data comparator 570. The header and address signal is recognized based upon a format as shown in FIG. 4B and is supplied to a main controller 610 through a serial-to-parallel buffer 580.

Figure 2:
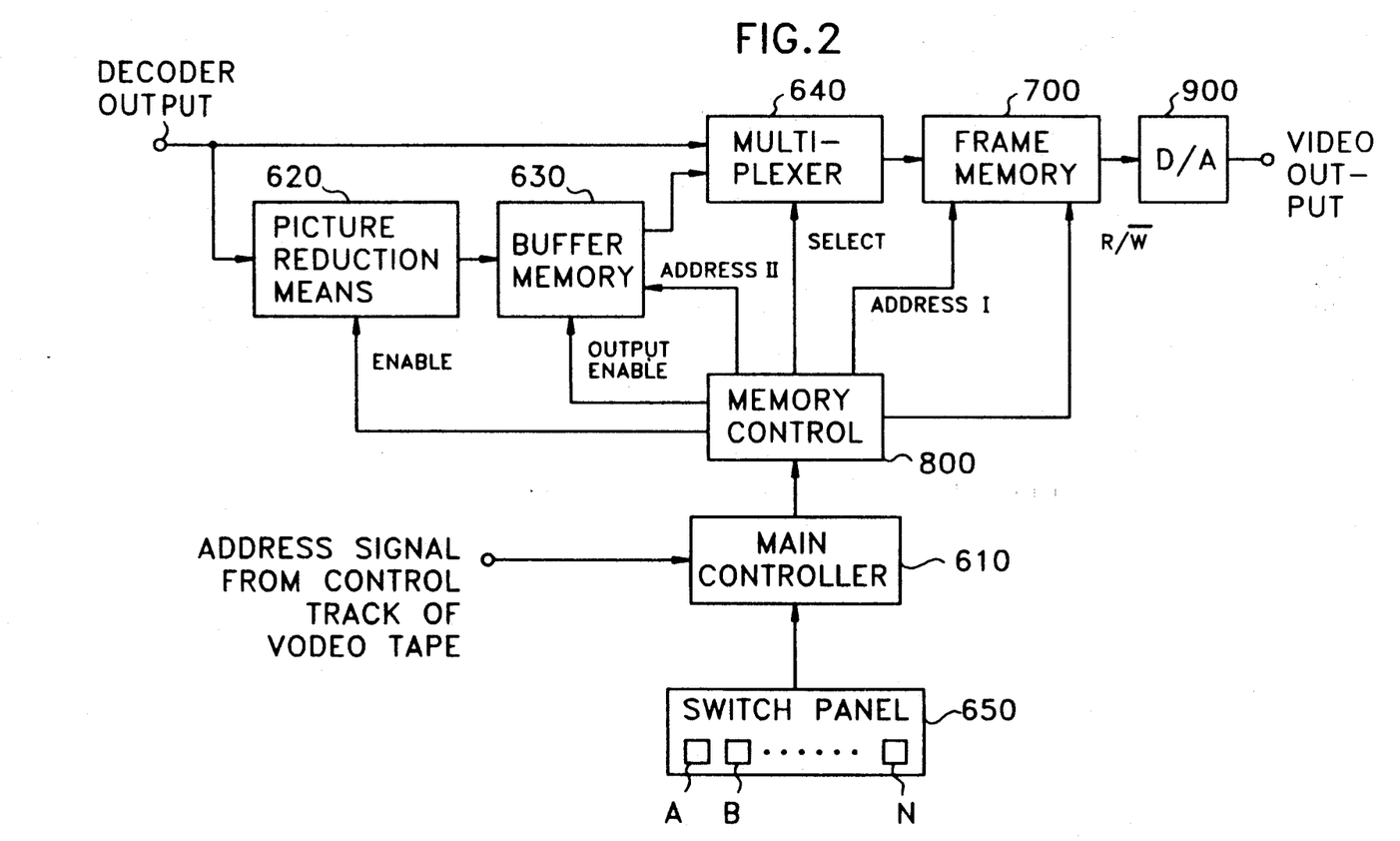
FIG. 2 a constitutional block diagram showing a part of the playback processing circuit within the video cassette tape recorder to which an index search apparatus is applied according to the present invention.

Referring to FIG. 2, a video signal playback processing circuit according to the present invention comprises an index search apparatus which is applied to a video signal playback processing circuit within a VCR. The index search apparatus comprises a picture reduction means 620 for reducing the picture image by a predetermined ratio, that is, a video signal output from the decoder 600 shown in FIG. 11.

Main controller 610 controls a memory control portion 800 in accordance with output data from a switch panel 650 in which a user selects an index designation, a search mode, and an address data picked up from the control track of the video tape. Buffer memory 630 assigns and stores the picture image data which is reduced in the picture reduction means 620. Buffer memory 630 reads the stored data in accordance with a control signal and an address signal output from the memory control portion 800. Multiplexer 640 receives the reduced picture image data and the original picture image data which are output from the buffer memory 630 and the decoder 600, respectively, and multiplexes them in accordance with a selection signal output from the memory control portion 800. Frame memory 700 writes in and reads out the original picture image data and the reduced picture image data output from the multiplexer 640 in a unit of frame by frame, and supplies the data to D/A converter 900. The frame memory 700 stores the reduced picture image data in a part of the original picture image data and reads out the stored data in accordance with a write-in/read-out signal and an address data output from the memory control portion 800.

The VCR adopting an index search apparatus having a composition as described above will be operated as follows.

Referring to FIG. 2, when the video signal is reproduced in a VCR to which the index search apparatus is applied without performing any index search, the multiplexer 640 selects the output signal of the decoder 600 in accordance with a selection signal output from the memory control portion 800. Accordingly, the selected original picture image data output from the decoder 600 is reproduced through the multiplexer 640 and the frame memory 700 as described above.

When the user performs an index search at the user's desired position of the picture image during the playback of the video signal as described above, an address signal read out from the control track is stored in register 1 of the main controller 610 and at the same time the reduced picture image data is stored in region 1 of the buffer memory 630 if the user presses an index switch A in a switch panel 650 of FIG. 2. If the user presses again the index switch A during the playback processing, the address signal in the time of pressing the index switch A is stored in register 2 of the main controller 610 and at the same time the reduced picture image data is stored in region 2 of the buffer memory 630. Whenever the index switch A is pressed as described above, the reduced picture image and the address signal are stored in the buffer memory 630 and the register of the main controller 610, respectively. When the regions of the register in the main controller and the buffer memory are limited to 4 regions, the fifth pressing of the index switch A has the reduced picture image and the address signal stored in the register 1 and the region 1 of the buffer memory 630, respectively, and then next pressing of the index switch A repeats the subsequent process.

When the positions of the picture image to be searched are stored using the index switch A, and then a search switch B in the switch panel 650 of FIG. 2 is pressed, the reduced picture image data stored in region 1 of the buffer memory corresponding to the address in the register 1 is displayed in a part of the original picture screen during the playback processing. Whenever a search switch B is pressed, the reduced picture images which are stored in region 2 of the buffer memory 630 corresponding to the address in the register 2, and in region 3 of the buffer memory 630 corresponding to the address in the register 3, and so on, are displayed sequentially.

That is, whenever the search switch B is pressed, the reduced picture images are displayed along with the sequence of 1, 2, 3, 4, 1, 2, ... in turn. When the desired picture image is displayed and then the index switch A is pressed, the main controller 610 compares the present address of the control track with the address of the picture image to be searched. Then, the main controller 610 supplies a rewind signal to the servo control circuit 550 if the present picture image is placed after the picture image to be searched, while it supplies a fast forward signal to the servo control circuit 550 if the present picture image is placed before the picture image to be searched, thereby searching the desired picture image in a high speed. When the index address to be searched is reached during the rewind operation or the fast forward operation, the VCR returns to the normal playback operation. If a reset switch N of the switch panel 650 of FIG. 2 is pressed, the index search operation is cleared to an index initial state.

Then, a picture reduction means 620 shown in FIG. 2 will be described below. The picture reduction means 620 utilized in the present invention is a kind of latch circuit and the operation thereof will be described below.

Figure 3A:
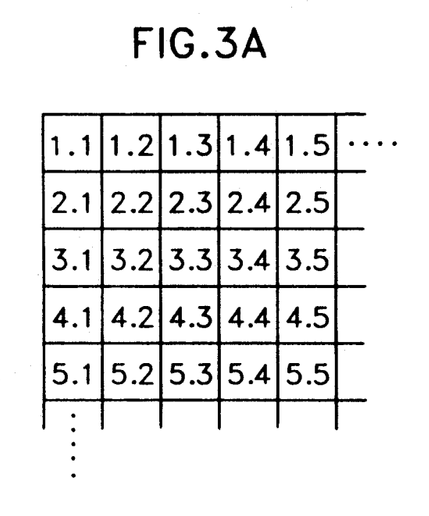
FIG. 3A, 3B and 3C show a data construction of an original picture image, a data construction of a picture image reduced by 1/16, and an example for constructing a buffer memory, respectively in order to explain a principle of a picture reduction applied to the present invention.

Referring to FIG. 2, the picture image data of (1, 1), (1, 2), (1, 3), ..., (2, 1), (2, 2), ... as shown in FIG. 3A are output from the decoder 600 in turn. Thereafter, when the main controller 610 orders the memory control portion 800 to reduce the picture image, the memory control portion 800 supplies a latch enable signal to the latch circuit.

Accordingly, the data of (1, 11) is latched, the data of (1, 2), (1, 3) and (1, 4) is not latched, and then the data of (1.5) is latched again. Thus, the memory control portion 800 supplies the latch signal to the latch circuit whenever the address number is increased by 4. Whenever the latch enable signal is generated, the address in the buffer memory is increased by 1 starting from 0 address.

Figure 3B:
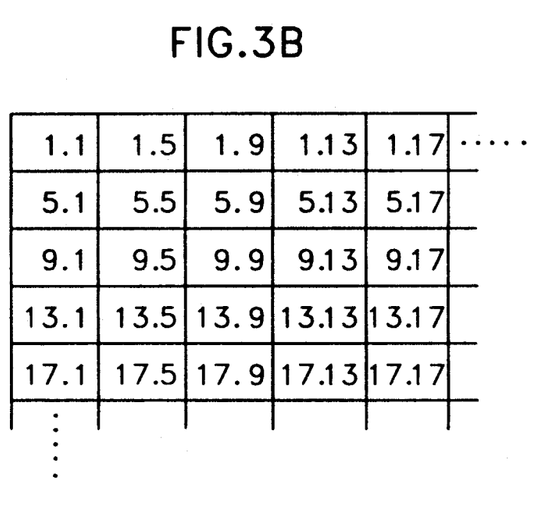
Figure 3C:
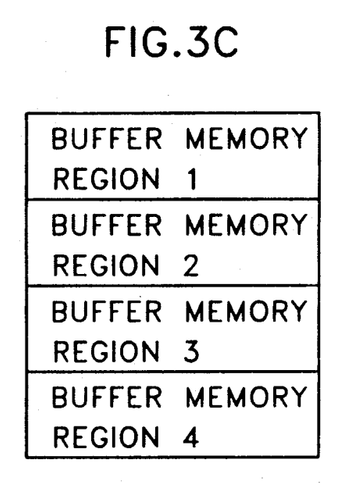

At this time, the memory control portion 800 does not supply an output enable signal in order to prohibit the buffer memory 630 to output the reduced picture image data. By such an operation, the data as shown in FIG. 3A is reduced by 1/16 with a data construction as shown in FIG. 3B. The constitution of the buffer memory 630 is shown in FIG. 3C as an example of dividing the memory region by 4. Accordingly, the numbers of the picture images to be indexed are four.

Next, a display method performed by writing the original picture image data and the reduced picture image data in the frame memory 700 and reading them from the frame memory 700 will be described below.

If the search switch B is pressed in the switch panel 650, the main controller 610 orders the memory control portion 800 to display the reduced picture image. The memory control portion 800 stores a start address of the buffer memory 630 corresponding to the reduced picture image ordered from the main controller 610. If the output data from the decoder 600 are input to the multiplexer 640, the memory control portion 800 controls the multiplexer 640 to select the output of the decoder 600, thereby storing the output data in the frame memory 700. At the same time, the memory control portion 800 supplies an address so that the address of the frame memory is increased by 1 starting from 0 address. The output data of the decoder 600 are stored in the frame memory 700 in sequence. At this time, if the present address in the frame memory 700 becomes an address for displaying the reduced picture image, the memory control portion 800 supplies an output enable signal to the buffer memory 630, supplies the address II to the buffer memory 630 by increasing the address by 1 from the start address of the picture image stored in the buffer memory 630, and at the same time controls the multiplexer 640 to receive the output of the buffer memory 630.

Figure 5A:
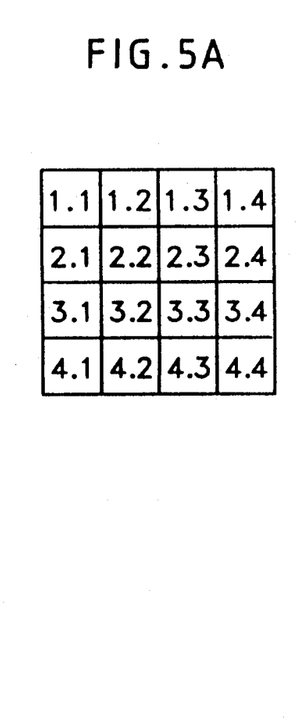
FIG. 5A and 5B show the constructions of the frame memory and the buffer memory storing the reduced picture image, respectively.
Figure 5B:
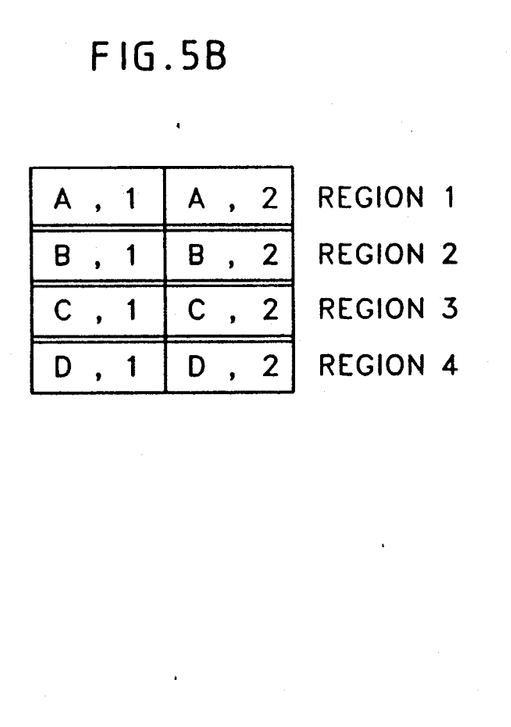

That is, by increasing the address of the frame memory 700 by 1 from the start address, when the address of the frame memory 700 reaches the data region of the present picture image, the multiplexer 640 is controlled to select the output of the decoder 600 in order to be stored in the frame memory 700, and when the address of the frame memory 700 reaches the data region for displaying the reduced picture image, the multiplexer 640 is controlled to select the output of the buffer memory 630 in order to be stored in the frame memory 700. In FIG. 5A and assuming that the address location for the reduced picture image is (4, 1) and (4, 2) in the frame memory 700, the memory control portion 800 supplies the addresses of (1, 1), (1, 2), (1, 3), (1, 4), (2, 1), ... to the frame memory 700 each time the output of the decoder 600 is input to the frame memory 700. At the same time, the multiplexer 640 is controlled to receive the output of the decoder 600, thereby the data of (1, 1), (1, 2), (1, 3), (1, 4), (2, 1), ... in sequence are stored in the frame memory 700. If the address reaches the address region of (4, 1) for displaying the reduced picture image, the multiplexer 640 is controlled to receive the output of the buffer memory 630. At this time, the memory control portion 800 supplies the address (A, 1) of the reduced picture image to be selected to the buffer memory 630, and at the same time supplies an output enable signal to the buffer memory 630, thereby the data of the buffer memory 630 of (A, 1) are stored in the frame memory 700 of (4, 1). Also, when the address of the frame memory 700 is (4, 2), the data of the buffer memory 630 of (A, 2) are stored in the frame memory 700 of (4, 2). When the address of the frame memory 700 is (4, 3), the multiplexer 640 is controlled to receive the output of the decoder 600 again.

Provided in the switch panel 650 shown in FIG. 2 are an index switch A, a search switch B and a reset switch N. As the search process of the present invention is described above with reference to FIG. 2, a plurality of the picture images to be searched are designated by the index switch A and a reduced still picture image is identified by the search switch B. Accordingly, if the index switch A in the switch panel 650 is pressed, the main controller 610 receives the present address of the picture image and compares the present address with the address to be searched, thereby deciding the travelling direction of the video tape and increasing the travelling speed of the video tape in accordance with the compared result. Next, if the present address during the travelling of the video tape is equal to the address to be searched, the driving state of the video tape returns to the normal playback state. Then, if the reset switch N is pressed in the switch panel 650 during the index search processing, the driving state of the VCR returns to the previous state prior to the index search operation.

As described above, a VCR adopting the index search apparatus according to the present invention has an effect that a picture image to be searched is identified with a reduced still picture image by designating a plurality of the indexed address information.

What is claimed is:

1. An index search method for locating a user's desired picture image among a plurality of picture images contained in a video signal which is recorded on a recording medium in accordance with header and address signals stored in the recording medium, said method comprising the steps of:
   (a) reducing picture images in a picture reduction means;
   (b) storing the reduced picture images into address regions of a buffer memory;
   (c) storing address signals in predetermined memory registers concurrently with the storage operation of step (b);
   (d) storing an original picture image in a frame memory;
   (e) reading the reduced picture image from the buffer memory and storing the reduced picture images in the frame memory within the original picture image at the same address regions in which the reduced picture images were stored in step (b);
   (f) displaying images stored in the frame memory on a display device, the images comprising the reduced still picture image in a part of the original picture image; and
   (g) sequentially varying the reduced picture images on the display device.

2. An index search method as claimed in claim 1, further comprising the step of storing the address signals in sequence in predetermined memory registers whenever an index switch is activated.

3. A digital video cassette tape recorder having a video signal record processing circuit for recording a video signal on a video tape after converting the video signal into a digital signal, the video signal playback processing circuit comprising;
   a playback amplifier for amplifying a reproduced digital video signal from the video tape through a playback head;
   an equalizer for equalizing the video signal output from the playback amplifier;
   a digital signal detector for detecting a digital signal in the video signal supplied from the equalizer;
   a decoder for decoding the video signal supplied from the digital signal detector;
   a switch panel including an index switch for selecting the video signal to be indexed among the digital video signals from the decoder, a search switch for selecting and outputting the indexed picture image by the index switch, and a reset switch for clearing the indexed picture images;
   a main controller for controlling a memory control portion in accordance with a control signal which a user selects from the switch panel and address data read from the control track of the video tape;
   a picture reduction means for reducing the video signal output from the decoder in accordance with a control signal supplied from the memory control portion;
   a buffer memory means connected to said picture reduction means for storing the reduced picture image data in the picture reduction means in accordance with control signals supplied from the memory control portion;
   a multiplexer for multiplexing the original picture image data and the reduced picture image data supplied from the buffer memory in accordance with a selection signal output from the memory control portion;
   a frame memory connected to said multiplexer for storing the original picture image data including the reduced picture image data in accordance with control signals supplied from the memory control portion; and
   a D/A converter for converting the digital video signal outputted from the frame memory into an analog video signal and outputting the analog converted video signal.

4. A video signal playback processing circuit for a VCR, comprising:
   means for detecting original picture image data;
   a memory control portion which generates control signals;
   a main controller for controlling the memory control portion in accordance with a predetermined control signal which a user selects from a switch panel;
   a picture reduction means for reducing the video signal in accordance with a control signal supplied from the memory control portion;
   a buffer memory means for storing reduced picture image in accordance with control signals supplied from the memory control portion;
   a multiplexer which multiplexes the original picture image data and reduced pictured image data supplied from said buffer memory means in accordance with a selection signal output from said memory control portion;
   a frame memory which stores reduced picture image data in a part of the original picture image data and outputs the stored data in accordance with a control signal output from said memory control portion.

5. A circuit as claimed in claim 4, further comprising:
   means for storing a start address of the buffer memory corresponding to the reduced picture image in the memory control portion.

6. A circuit as claimed in claim 4, wherein said memory control portion transmits a control signal including an output enable signal to said buffer memory which permits said buffer memory to transmit the reduced picture image to said multiplexer.

7. A video signal playback processing circuit for searching a video recording medium for a predetermined image during playback processing of the recording medium, said circuit comprising:
- a main controller which stores an address signal read from a control track of the video recording medium and generates control commands;
- picture reduction means for reducing picture images of the video signal;
- a memory control device connected to said picture reduction means and said main controller which transmits a plurality of control signals including a control signal to said picture reduction means to enable operation of said picture reduction means;
- a buffer memory connected to said picture reduction means having an output enable line and an address line connected to said memory control device, said buffer memory storing the reduced picture images at predetermined address locations responsive to one of the plurality of control signals output from said memory control device;
- a multiplexer which receives the video signal as a first input and which is connected to said buffer memory to receive the reduced picture images as a second input, said multiplexer being connected to said memory control device such that output of said multiplexer fluctuates between the first and second inputs in response to one of the plurality of control signals transmitted by said memory control device; and
- a frame memory connected to said memory control device for storing the video signal output from said multiplexer at predetermined address locations and for storing reduced picture images at predetermined address locations in response to one of said control signals transmitted from said memory control device;
- display means connected to said frame memory for displaying the reduced picture images within the video signal;
- user operated switch panel means connected to said main controller for identifying picture images to be reduced and for causing said display panel to sequentially display individual reduced picture images in a part of the video signal so that the user can identify the desired picture image.

8. An apparatus according to claim 7 wherein said main controller compares a present address of the video signal with an address of the reduced picture image and generates a signal to move the recording medium to the address of the reduced picture image.

9. An apparatus according to claim 7 wherein the predetermined address locations where the reduced picture images are stored in said buffer memory are the same as the predetermined address locations where the reduced picture images are stored in said frame memory.

* * * * *

UNITED STATES PATENT AND TRADEMARK OFFICE
CERTIFICATE OF CORRECTION

PATENT NO. : 5,233,485

DATED : August 3, 1993

INVENTOR(S) : Chang-jin Yang

It is certified that error appears in the above-indentified patent and that said Letters Patent is hereby corrected as shown below:

Claim 6, column 8, line 68, change "image" to --images--.

Signed and Sealed this

Twenty-ninth Day of March, 1994

Attest:

BRUCE LEHMAN

*Attesting Officer*  *Commissioner of Patents and Trademarks*